(12) United States Patent
Ichikawa

(10) Patent No.: US 6,934,685 B1
(45) Date of Patent: Aug. 23, 2005

(54) VOICE RECOGNITION DEVICE FOR TOYS

(75) Inventor: Takashi Ichikawa, Tochigi (JP)

(73) Assignee: Toytec Corporation, Tochigi (JP)

( * ) Notice: Subject to any disclaimer, the term of this patent is extended or adjusted under 35 U.S.C. 154(b) by 0 days.

(21) Appl. No.: 09/719,514

(22) PCT Filed: Apr. 21, 2000

(86) PCT No.: PCT/JP00/02642

§ 371 (c)(1),
(2), (4) Date: Dec. 13, 2000

(87) PCT Pub. No.: WO00/65575

PCT Pub. Date: Nov. 2, 2000

(30) Foreign Application Priority Data

Apr. 21, 1999 (JP) ................................. 11/114222

(51) Int. Cl.⁷ ............................................. G10L 15/00
(52) U.S. Cl. ...................................... 704/275; 704/253
(58) Field of Search ............................... 704/256, 253, 704/275

(56) References Cited

U.S. PATENT DOCUMENTS

| 4,761,815 | A | * | 8/1988 | Hitchcock | .................... | 704/253 |
| 5,209,695 | A | * | 5/1993 | Rothschild | ................... | 446/175 |
| 5,444,817 | A | * | 8/1995 | Takizawa | .................... | 704/254 |
| 6,471,420 | B1 | * | 10/2002 | Maekawa et al. | ........... | 704/250 |
| 6,594,630 | B1 | * | 7/2003 | Zlokarnik et al. | .......... | 704/256 |

* cited by examiner

*Primary Examiner*—Daniel Abebe
(74) *Attorney, Agent, or Firm*—Swidler Berlin LLP

(57) ABSTRACT

The present invention provides a speech recognition device for toys comprising a storage means for measuring the length in time of a combination of two or more continuous words or expressions and the length in time of a pause or pauses between the words or expressions and then storing a measured value in advance, a control means for measuring the length in time of a word or expression spoken by a speaker, comparing a measured value with the measured value stored in the storage means, and recognizing the word or expression of the speaker in the event that the result of the comparison falls within a predetermined tolerance and an output means for outputting the result of the recognition so carried out.

5 Claims, 5 Drawing Sheets

VOICE RECOGNITION DEVICE FOR TOYS

BACKGROUND OF THE INVENTION

1. Field of the Invention

The present invention relates to a speech recognition device for toys for recognizing the speech of a number of unspecified people.

2. Description of Related Art

In conventional speech recognition devices for toys, a speech recognition device for toys for recognizing a specific person is designed to recognize words spoken by only one person, and the speech of the speaker has to be registered in a RAM or a ROM before he or she actually uses the toy. Although the recognition rate of the ROM is not bad, there exist the following problems; no one other than the registered person can use the toy, the registration of a user is required, and the registered speech is lost once the power is down. The speech recognition device is not suitable for use in toys in particular for very young children. Among the problems is a critical problem that the speech recognition device allows only one person to use it, and therefore, the device limits the application thereof.

On the other hand, a speech recognition device for recognizing speech of unspecified people is designed to recognize the speech of any person, and no registration is required before the device is actually used. However, it is required to input speech of a number of people in a ROM in advance, and the initial production of speech data requires difficult work. In addition, as the number of words or speech to be recognized increases, the work gets more complicated and the capacity of the memory for storing the increasing speech data has to be extended, high production costs thereby resulting. Japanese Examined Patent Publication No. 2-39798 discloses a related conventional example. In this conventional example, the length of an inputted spoken word is measured, and when the measured length is determined to coincide with the length of the word determined by a speech registration switch, speech is outputted. However, in a case where the length of a word is measured, there occur continuous malfunctions in a noisy place, and it is found that the device is not totally suitable for practical use.

In addition, although the device is designed to recognize words or speech of unspecified people, it only can recognize in the order of ten to twenty words of speech, and the device cannot recognize every word people speak. Due to this, the user has to consult with an owner's manual every time he or she wants to know what type of speech can be recognized, and in this sense the speech recognition device which has to originally be convenient is not convenient.

An object of the present invention is to provide a speech recognition device for recognizing the speech of a number of unspecified people using a microcomputer or a speech synthesis IC, wherein the length of a pause or pauses of two or more words is measured, and whereby speech is recognized.

Another object of the present invention is to provide a speech recognition device for recognizing the speech of a number of unspecified people, wherein the length in time of a word spoken by a speaker for recognition is measured, and whereby the speech is recognized.

A further object of the present invention is to provide a speech recognition device for recognizing the speech of a number of unspecified people, wherein the length in time of a word spoken by a speaker is compared with the length in time of a corresponding speech synthesized word, and in the event that the result of the comparison falls within a predetermined tolerance, the word spoken by the speaker is recognized, and whereby the recognition of the word is effected.

SUMMARY OF THE INVENTION

According to a first aspect of the present invention, there is provided a speech recognition device for toys comprising a storage means for measuring the length in time of a combination of two or more continuous words or expressions and the length in time of a pause or pauses between the words or expressions and then storing a measured value in advance, a control means for measuring the length in time of a word or expression spoken by a speaker, comparing a measured value with the measured value stored in the storage means, and recognizing the word or expression of the speaker in the event that the result of the comparison falls within a predetermined tolerance and an output means for outputting the result of the recognition so carried out.

According to the configuration, in addition to the recognition of the meaning of one word or expression, the meaning of a set of two or more words or expressions which are continuously spoken can be recognized from a combination of the two or more words or expressions and a pause or pauses between the words or phrases when they are so spoken. For example, in recognition of a combination of two expressions, when having recognized a combination of "konnichiwa (hello)" and "ii tenki desu (it is a good weather)," the first expression and the second expression are recognized together with a pause there between which should be provided when they are spoken, whereby the meaning of the combination of the two expressions, "konnichiwa, ii tenki desu (Hello, it is a good weather)" can be recognized. When people express, some people speak fast and others slowly, and therefore, one expression is made to be recognized in two ways, short and long. When first and second expressions are made to be recognized in two ways; short and long, respectively, the recognition of the two expressions can be made in four ways. Then, when a pause is provided between the first and second expressions, the pause is also made to be recognized in two ways; short and long, and as a result of this, the combination of the expressions can be recognized in eight ways, whereby a speech recognition device for toys with higher accuracy can be provided.

Thus, in the event that the length of either or any of two or more words or expressions differs from those stored in the storage means or the length of the pause between any two of the two or more words or expressions differs from that stored in the storage means, since the control means does not recognize the combination, there occurs no malfunction or mal-recognition.

In addition, according to a second aspect of the present invention, there is provided a speech recognition device for toys comprising a storage means for measuring the length in time of a word or expression spoken by a speaker for recognition and then storing a measured value in advance, a control means for measuring the length in time of a word or expression spoken by a speaker, comparing a measured value with the measured value stored in the storage means and recognizing the word or expression of the speaker in the event that the result of the comparison falls within a predetermined tolerance and an output means for outputting in voice the result of the recognition so carried out.

According to the configuration, since the speech recognition device is designed for use in toys for children, when a child as a player speaks to the speech recognition device, the device measures the length in time of the word or expression of the speaker, recognizes the word or expression of the speaker in the event that the result of the comparison falls within a predetermined tolerance, and outputs word or expression as the result of the recognition via a device main body. For instance, in the case of a toy which is a model of a cat, when the player calls the name of the cat toy, "Tama", it answers the player by mewing. Thus, according to the present invention, an interactive speech recognition toy like one described above can be provided.

Furthermore, according to a third aspect of the invention, there is provided a speech recognition device for toys comprising a storage means for storing the length in time of a speech synthesized word or expression in advance, an output means for outputting the speech synthesized word or expression and a control means for measuring the length in time of a word or expression spoken by a speaker, comparing a measured value with the length in time of the speech synthesized word or expression stored in the storage means, recognizing the word or expression of the speaker in the event that the result of the comparison falls within a predetermined tolerance and an outputting means for outputting the result of the recognition.

According to the configuration, the conversation with a machine (IC) can be realized by making an IC execute both speech synthesis and speech recognition, and moreover, the conversation with the machine can be realized at extremely low cost. For example, in a case where an expression, "ohayo (good morning)" is speech synthesized, if the length of an expression spoken by a speaker for recognition falls within a predetermined tolerance of the speech synthesized expression, "ohayo (good morning)", the spoken expression can be recognized. The speech synthesized expression "ohayo (good morning)" is provided with a predetermined tolerance in length; short and long, and therefore even if the expression is spoken fast or slowly, the length of the spoken expression falls within the predetermined tolerance, the expression can be recognized.

Furthermore, according to a fourth aspect of the present invention, there is provided a speech recognition device for toys as set forth in the third aspect above, comprising a control means for measuring the length in time of a word or expression spoken by a speaker which corresponds to the outputted speech synthesized word or expression, comparing a measured value with the length in time of the speech synthesized word or expression which is stored in the storage means and recognizing the spoken word or expression of the speaker in the event that the result of the comparison falls within a predetermined tolerance, and an outputting means for outputting the recognized result.

According to the configuration, the speech recognition device measures the length in time of the word or expression spoken by the speaker which corresponds to the outputted speech synthesized word or expression and recognizes the word or expression by the speaker provided that the measured value falls within the predetermined tolerance. Namely, the player can enjoy a quiz by imaging a word or expression in association with the outputted speech synthesized word or expression. For example, here is a speech synthesized question, "what is the highest mountain in Japan?" and if the player or speaker answers "Mt. Fuji," the answer is correct and is then recognized.

In addition, according to a fifth aspect of the present invention, there is provided a speech recognition device for toys as set forth in the third or fourth aspect of the present invention, wherein the storage means stores the length in time of a combination of the length in time of the speech synthesized words or expressions and the length in time of a pause between the words or expressions in advance, wherein the control means measures the length in time of the pause between the words or expressions and the length in time of words or expressions spoken by the speaker, compares measured values with the length in time of the combination of the length in time of the pause stored in the storage means and the length in time of the words or expressions spoken by the speaker for recognition and recognizes the words or expressions by the speaker provided that the result of the comparison falls within the predetermined tolerance.

According to the configuration, since the length in time of the combination of the length of a blank time since the speech synthesized words or expressions have been outputted until the words or expressions spoken by the speaker for recognition are expressed and the length in time of the words or expressions by the speaker, a speech recognition with less errors can be attained.

BEST MODE FOR CARRYING OUT THE INVENTION

With a view to describing the present invention in greater detail, a best mode for carrying out the invention will be described below with reference to the accompanying drawings.

Figure 1:
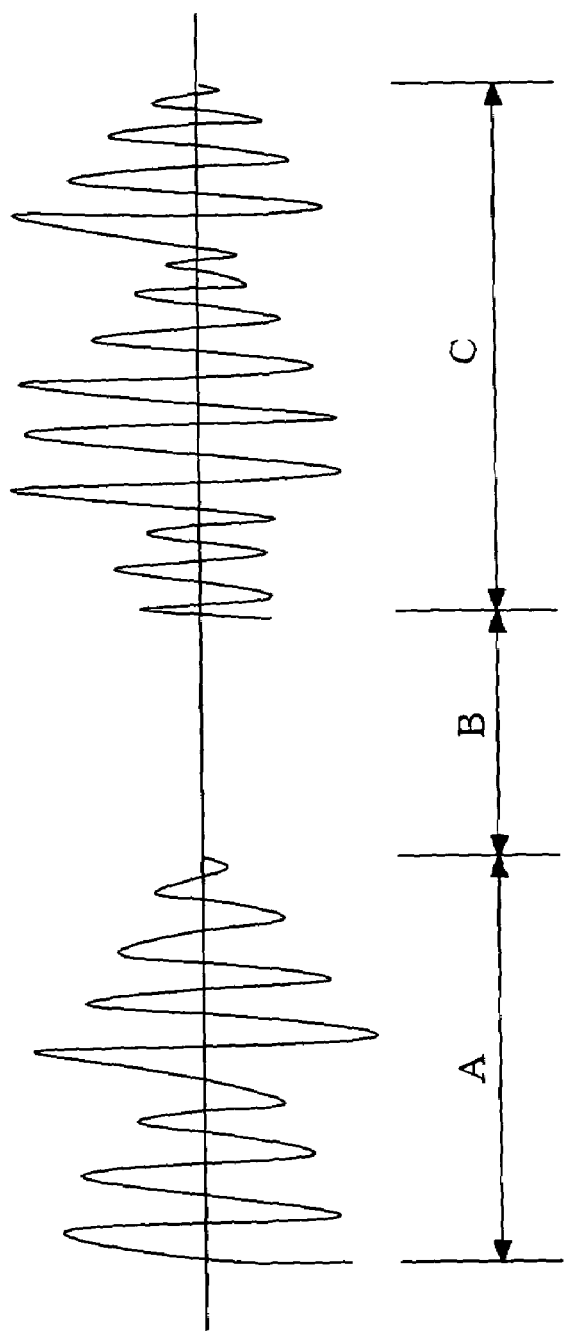
FIG. 1 is a diagram showing a principle according to the present invention for measuring the length in time of a word or expression.

FIG. 1 is a diagram showing a principle according to the present invention for measuring the length in time of a word or expression. Reference character A denotes the length of a word or expression, and for example, an expression, "konnichiwa (hello)" and an expression "konbanwa (good evening)" are an expression of five Japanese Hiragana characters or five syllables and the length or the number of characters or syllables of the two expressions is the same. Reference numeral C also denotes the length of an expression such as "ii tenki desu (it is a good weather)" or "okaimono desu (I'm doing the shopping)" of seven Japanese Hiragana characters or syllables and therefore the length of the two expressions is identical. Reference character B is the length of a pause between the expression A and the expression C and denotes the length of interposed between the expression "Hello" and "It's a good weather" when the speaker expresses, "Hello . . . Its a good weather."

Thus, the two expressions are expressed continuously, and the meaning thereof is recognized by the combination of the expressions and the pause therebetween. Consequently, the recognition is effected in the event that the length of a combination of the expression A, the length of the pause B and the expression C falls within the tolerance of the length of a set expression. Additionally, the recognition is-effected even if a combination of the expression A and the expression C or a combination of the pause B and the expression C falls within the tolerance of the length of the set expression. The recognitions are totally processed by a microcomputer, which will be described later.

Figure 2:
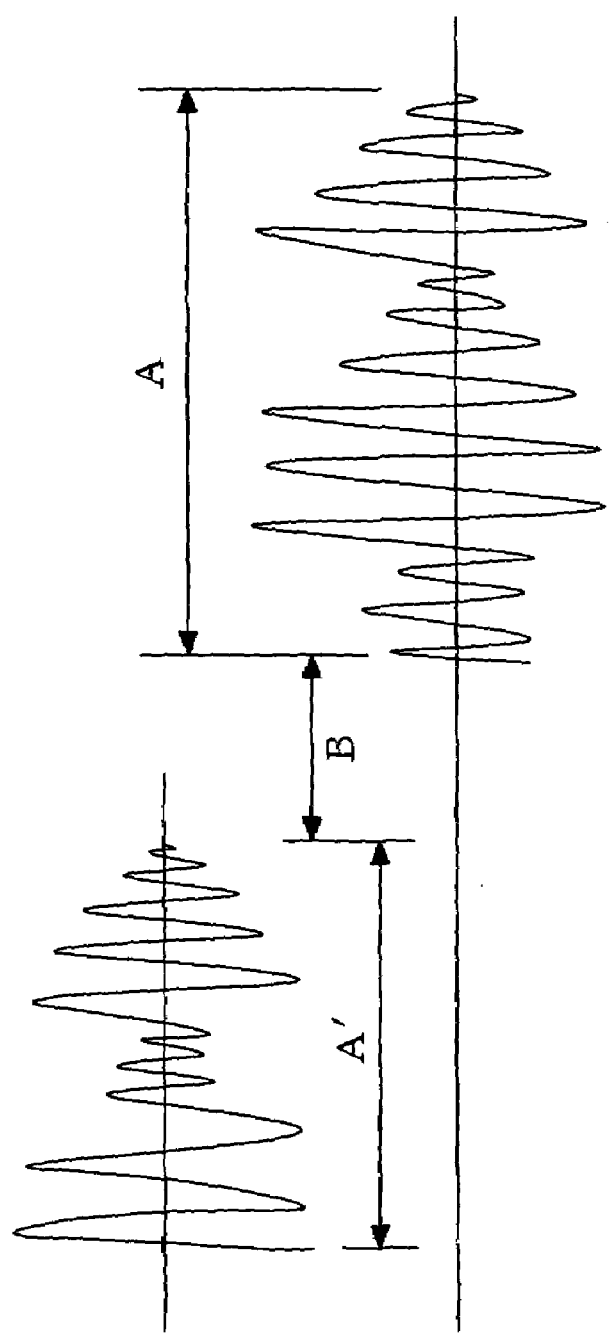
FIG. 2 is a diagram showing another principle according to the present invention for measuring the length in time of a word or expression.

Next, FIG. 2 is a diagram showing another principle according to the present invention for measuring the length in time of a word or expression. Reference character A' denotes the length of a speech synthesized expression produced when a speech synthesized expression is expressed as an IC output such as an expression "ohayo (good morning)" of four Japanese Hiragana characters or syllables. In the figure, a lower line denotes a speech input, and reference character A is the length of a word or expression corresponding to the speech synthesized sound A', and if the lengths of A' and A are identical, then the sound by the speaker is recognized. Reference character B denotes a pause between the speech synthesized sound A' and the sound A produced by the speaker or since the speech synthesized sound is outputted until the speech is inputted for recognition and with this pause a speech recognition with fewer errors can be provided. Namely, in the former case, the speech recognition is effected based on the length A of the sound only, whereas in the latter case, the speech recognition is effected based on the combination of the length B of the pause and the length A of the sound, and therefore the recognition capability can be increased with the latter case. Furthermore, it is possible to make the speaker imagine a word or expression following an initial speech synthesized sound when the latter is expressed. For example, when a question "What is the highest mountain in Japan?" is asked in speech synthesized sounds A', if the speaker answers "Mt. Fuji" as sounds produced by the speaker, then the answer is recognized. In this case, the speaker can operate the speech recognition device without consulting the owner's manual every time.

Figure 3:
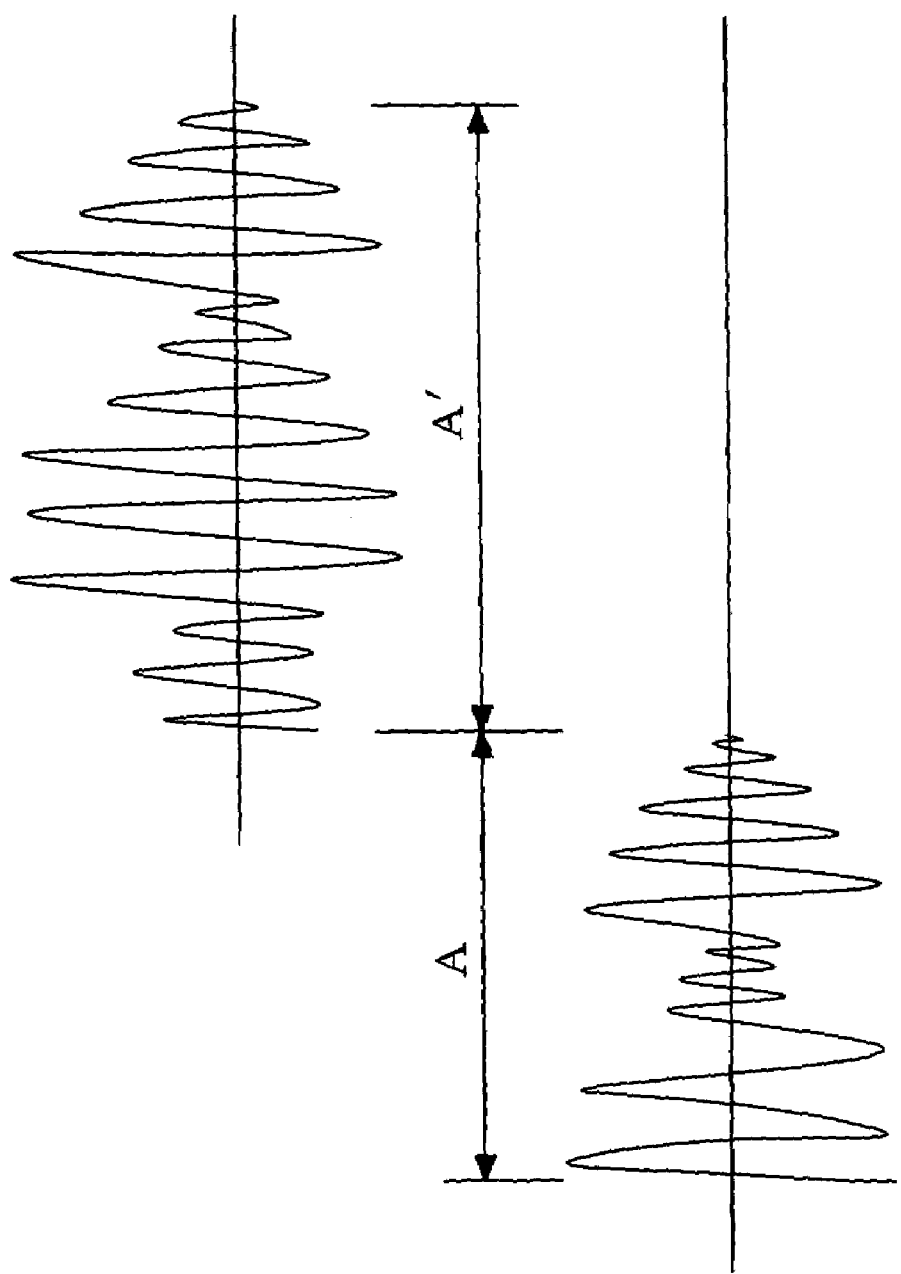
FIG. 3 is a diagram showing a further principle according to the present invention for measuring the length in time of a word or expression.

FIG. 3 is a diagram showing a further principle according to the present invention for measuring the length in time of a word or expression. Reference character A denotes the length in time of a word or expression expressed by the speaker and is the length of a word "Tama (the name of a cat)" of two Japanese Katakana characters or syllables. In the figure, a lower line is a speech input by the speaker.

Reference character A' denotes a speech synthesized sound produced when a word or expression produced through speech synthesis is expressed as an IC output, and when there is a speech input "Tama," a synthesized speech "mew" is expressed in reply to the speech input. In this case, the speech input by the speaker is compared with a measured value stored in the storage part, and when the result of the comparison falls within a predetermined tolerance, the word of the speaker is recognized, and the result of the recognition is outputted in speech.

Figure 4:
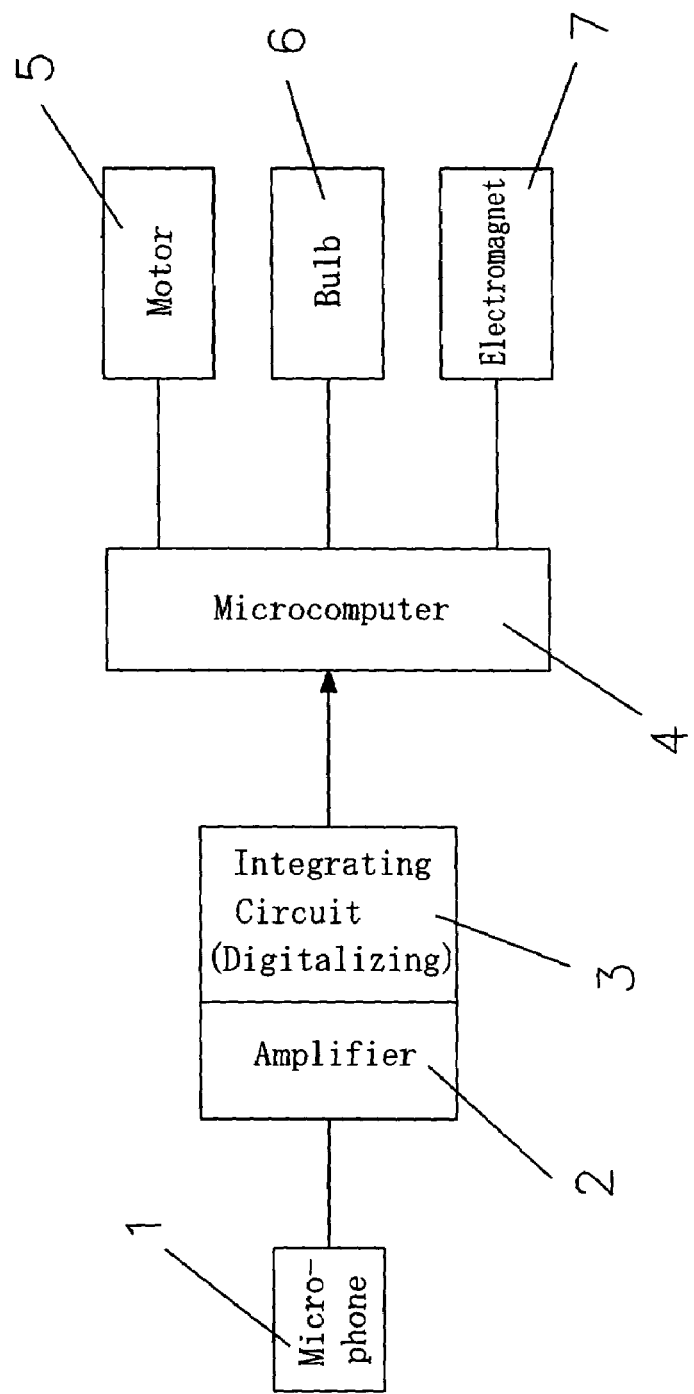
FIG. 4 is a diagram showing the configuration of hardware for use in the present invention.

FIG. 4 is a diagram showing the configuration of hardware for use in the present invention. In this embodiment, a microcomputer is used and only speech recognition is carried out. A speech signal having passed through a microphone 1 is amplified at an amplifier 2, thereafter an analog signal is converted into a digital signal at an integrating circuit 3, and the digital signal so converted is then inputted into a microcomputer 4. The microcomputer 4 comprises a storage part in which combinations of two or more continuous words or expressions, an operating part for recognizing a word or expression by the speaker when the length in time of the word or expression falls within a predetermined tolerance and a control part for outputting the result of the recognition. Thus, the digital signal inputted into the microcomputer 4 is controlled at the control part, thereafter the control signal is received by the operating part, and an operating process is carried out at the operating part to see if the control signal and the first word or expression stored in the storage part can be recognized as the word or expression of the speaker, and when the control signal and the first word are determined to be recognized as the word or expression of the speaker as a result of the operating process, an LED or bulb is illuminated. The speaker can recognize that the first word has been recognized through the illumination of the LED or bulb and times the input of a second word before the LED or bulb is switched off. A similar operating process to that carried out for the first word is performed, and when the second word is determined to be recognized, then the control part output an electric signal for driving a motor 5, illuminating or blinking a bulb 6 or activating an electromagnet 7, whereby the arms, legs, eyes or mouth of a stuffed toy or doll can be activated, and at the same time a conversation with the toy can be realized.

Figure 5:
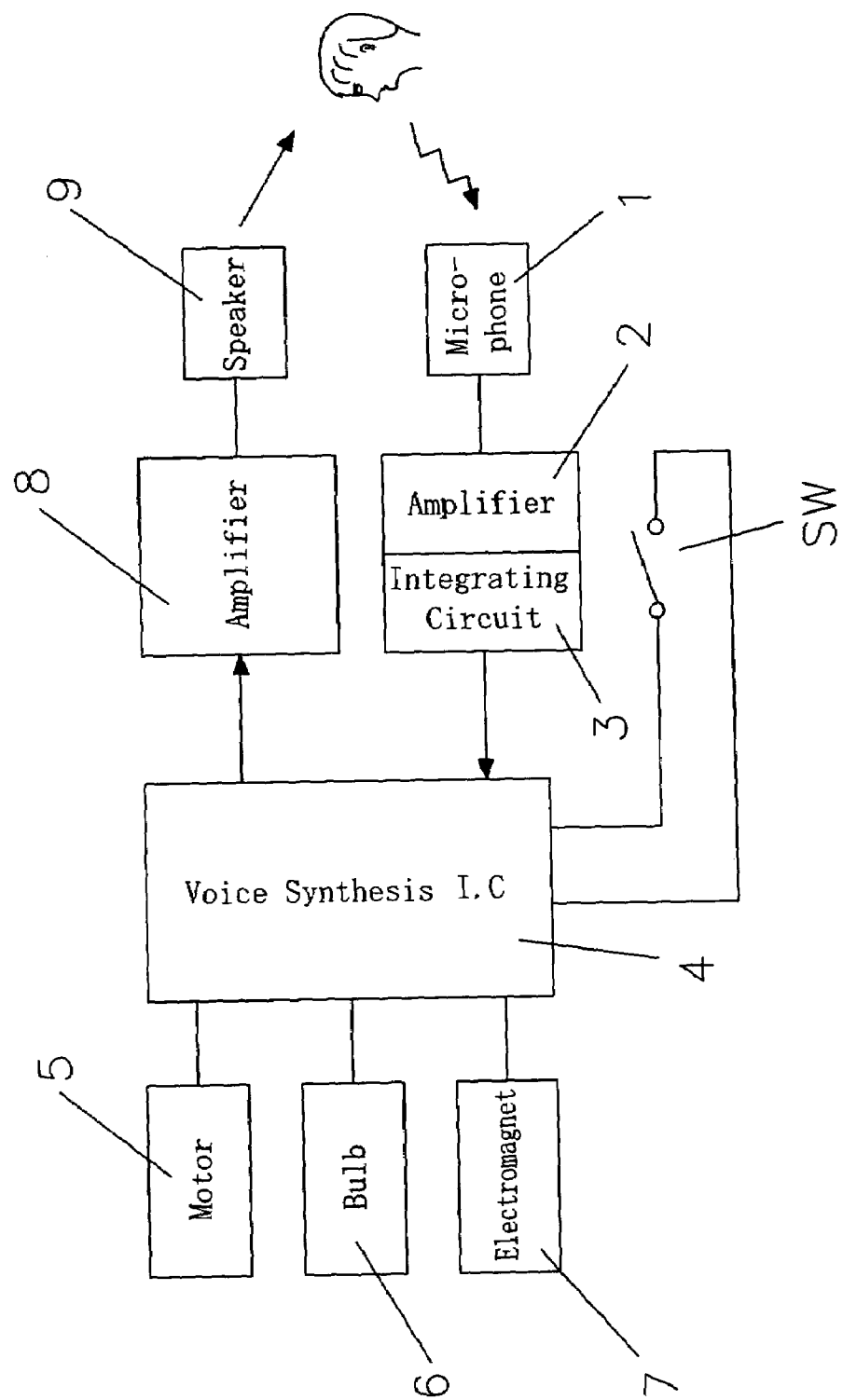
FIG. 5 is a diagram showing another configuration of hardware for use in the present invention.

FIG. 5 is a diagram showing the configuration of another hardware for use in the present invention. In this embodiment, a speech synthesis IC is used for speech recognition. Normally, an inexpensive 4-bit or 8-bit microcomputer can be used for a speech recognition microcomputer. However, in this embodiment, in order to further reduce the production cost, a normal speech synthesis IC is programmed for use for this purpose. When a switch SW of a main body is closed, the speech synthesis IC 4 controls such that a speech synthesized sound is amplified at an amplifier 8 and that the speech synthesized sound so amplified is then outputted through a speaker 9. When the output of the speech synthesized sound is completed, the LED or bulb is illuminated. The user times the expression of a word or expression corresponding to the speech synthesized sound through the microphone 1 before the LED or bulb is switched off. The user speaks a word or expression corresponding to the speech synthesized sound through the microphone 1 when he or she hears the speech synthesized word or expression. In this case, the user may speak the word or expression corresponding to the speech synthesized sound instantaneously he or she hears the speech synthesized sound, or the user may answer the speech synthesized sound after a certain pause since the speech synthesized sound is outputted. These operations are totally processed through the program. The speech signal passing through the microphone 1 is amplified at an amplifier 2, and thereafter an analog signal is converted into a digital signal at an integrating circuit 3, the digital signal so converted being then inputted into the speech synthesis IC. When the word or expression having a length corresponding to the speech synthesized sound is inputted into the speech synthesis IC, the result of the speech recognition by the program is outputted as speech, whereby a motor 5 is driven, the bulb 6 is illuminated or blinked or the electromagnet 7 is activated. Thus, the arms, legs, eyes or mouth of a doll can be activated through a speech command, and at the same a conversation with the toy can be realized.

According to the present invention, it is possible to repeat by using the speech synthesis IC a process in which an answer is given in response to a question from the computer, and this assumes a real conversation made between human beings, whereby the user can express his or her wishes in a sequential fashion. Finally, it is possible to make the microcomputer or speech synthesis IC to recognize many things to thereby make it follow orders from the user.

IDUSTRIAL APPLICABILITY

As has been described heretofore, according to the present invention, where the system of the invention is programmed in the microcomputer or speech synthesis IC, a speech recognition device can be provided which is simple in configuration and inexpensive in cost, whereby a conversation with the computer can be realized. In addition, according to the present invention, the recognition accuracy can be increased by combining a plurality of words or expressions and limiting the length of each word or expression and the length in time of the pause between the words or expressions. Moreover, according to the present invention, in a case where the speech synthesis IC is used for speech recognition, it is possible to make the user to imagine the contents of a speech by the user or to make the speech recognition device speak the contents of a guidance, this obviating the necessity of an owner's manual on how to use the speech recognition device. Furthermore, according to the present invention, it is possible to make the microcomputer output in response to the result of a speech recognition for synchronization of actions other than a conversation. In addition, since the recognition is carried out based on the length of a sound, the speech of any person can be recognized irrespective of sex, age or the like of the speaker. Additionally, since only data on the lengths of sounds are programmed, the memory capacity of the system can be reduced extremely, whereby a low priced product can be provided. In particular, in a case where a speech synthesis IC is used, an extremely low priced product can be provided.

In addition, according to the present invention, no speech registration is required at all before use, and therefore the speech recognition device according to the present invention can be used just after it is switched on. According to the present invention, although the speech of a number of unspecified people can be recognized, speech data does not have to be collected. Furthermore, according to the present invention, the speech recognition device thereof is small in size and consumes very little power, and therefore a speech recognition device can be produced which is small in size and uses a small battery, a certain effectiveness in economy being thereby exhibited.

What is claimed is:

1. A speech recognition device for toys comprising:
storage means for storing pre-measured values for combinations of the lengths in time of two or more consecutively spoken expressions and the length in time of a pause or pauses between said consecutively spoken expressions;
control means for measuring the lengths in time of expressions spoken consecutively by a speaker for recognition, including the length in time of a pause or pauses between consecutively spoken expressions; and
operating means for comparing the measured lengths in time with said pre-measured values stored in storage to recognize the consecutively spoken expressions based on the combination of their lengths in time.

2. A speech recognition device for toys comprising:
storage means for storing pre-measured values for the total lengths in time of spoken expressions, including the length of time of a pause or pauses between individual words within the expression;
control means for measuring the length in time of an expression spoken by a speaker for recognition;
operating means for comparing the measured length of time with said pre-measured values stored in said storage means and recognizing said expression of the speaker in the event that the result of said comparison falls within a predetermined tolerance; and
output means for outputting in voice the result of said recognition so carried out.

3. A speech recognition device for toys comprising:
storage means for storing a value for the length in time of a voice synthesized expression;
output means for outputting said voice synthesized expression or recognizing a spoken expression;
control means for measuring the length in time of an expression spoken by a speaker for recognition,
operating means for comparing the measured length in time with the value for the length in time of said voice synthesized expression stored in said storage means and recognizing said expression of the speaker in the event that the result of said comparison falls within a predetermined tolerance; and
outputting means for outputting the result of said recognition.

4. A speech recognition device for toys as set forth in claim 3, wherein the expression spoken by a speaker corresponds to said outputted voice synthesized expression.

5. A speech recognition device for toys as set forth in claim 3 or claim 4, wherein
said voice synthesized expression includes consecutively voiced expressions and the length in time of a pause or causes between said consecutively voiced expressions; and
wherein said expressions spoken by the speaker includes consecutively spoken expressions and the length of time of a pause or pauses between said consecutively spoken expressions.

* * * * *